April 28, 1964     D. D. SPENCER ETAL     3,131,386
MULTIPLE CIRCUIT SIGNAL LEVEL MONITOR
Filed Dec. 4, 1959     2 Sheets-Sheet 1
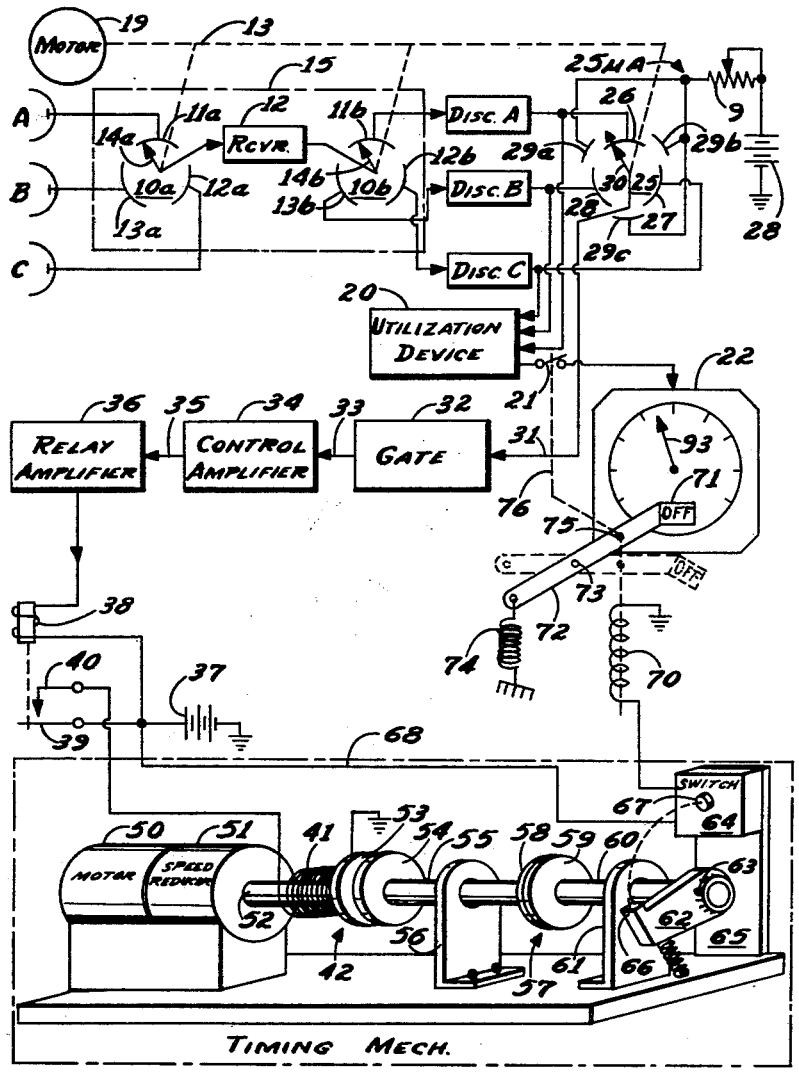
FIG 1
INVENTORS
DONALD D. SPENCER
ARDIS G. VANCE
BY
ATTORNEY April 28, 1964     D. D. SPENCER ETAL     3,131,386
MULTIPLE CIRCUIT SIGNAL LEVEL MONITOR
Filed Dec. 4, 1959     2 Sheets-Sheet 2
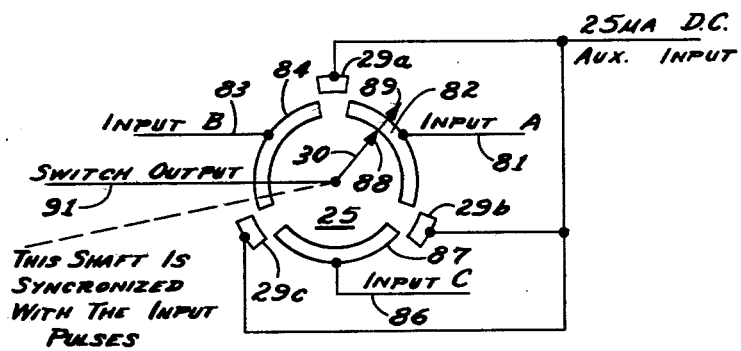
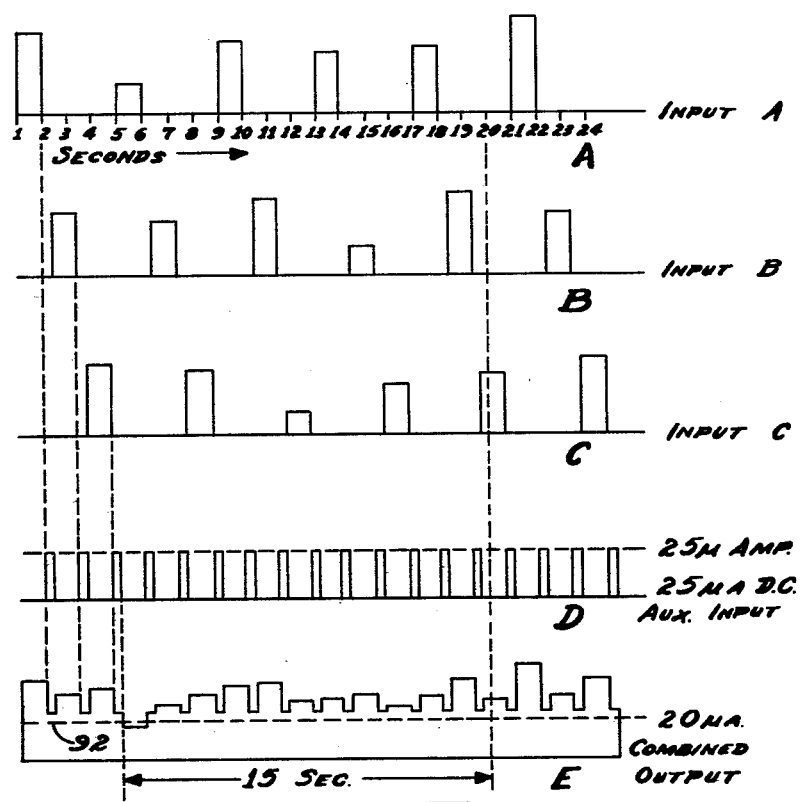
INVENTORS
DONALD D. SPENCER
ARDIS G. VANCE
BY
*Marv Moody*
ATTORNEY

United States Patent Office 3,131,386
Patented Apr. 28, 1964

3,131,386
MULTIPLE CIRCUIT SIGNAL LEVEL MONITOR
Donald D. Spencer, Cedar Rapids, and Ardis G. Vance,
Toddville, Iowa, assignors to Collins Radio Company,
Cedar Rapids, Iowa, a corporation of Iowa
Filed Dec. 4, 1959, Ser. No. 857,386
4 Claims. (Cl. 340—248)

This circuit deals generally with a multiple circuit signal level monitor and more particularly with a signal level monitor which samples a plurality of pulse-generating circuits, combines the sampled data, compares the level of the combined sampled data with a reference signal level, and deactivates subsequent circuitry for a limited time if any of the individual pulses fall below the reference signal level.

This invention is incorporated in equipments such as doppler radar navigation systems. Navigation systems of this type may incorporate for transmitting and receiving a plurality of antennas which are used on a time shared basis. Each antenna is sequentially connected to a receiver, amplified, and applied to its individual discriminator. The output from each of the discriminators may be applied to a utilization device such as a computer where the information is analyzed and converted to information which is suitable for the operation of a read-out device such as an indicator. Each of the antennas is situated such that the signals transmitted and received will indicate the aircraft's direction, altitude, drift, and other pertinent information necessary for navigation of an aircraft over extended distances.

Normally, an adequate return signal is received at all times so that the voltage to the discriminator has sufficient magnitude to accurately actuate the computer. However, under certain conditions such as momentary failure in any one of the channels between an antenna and its discriminator, insufficient signal will exist at the output of the discriminators and unreliable information will be fed to the utilization circuit or computer. Under this condition the circuit will give erroneous information to the navigation indicator.

Therefore, it is an object of this invention to provide a signal level monitor which will sample each of the discriminators during its sequential operation to insure that its signal level is above a predetermined magnitude.

It is a further object of this invention to provide a signal level monitor that will instantly deactivate the circuit should any one of the discriminator signal magnitudes fall below the predetermined level.

It is a further object of this invention to provide a signal level monitor which will deactivate the system when the signal from any circuit falls below a predetermined level and maintain the circuit in a deactivated state during insufficient level for a period of time sufficient to insure proper operation of the navigation indicator when the circuit is reactivated.

It is another object of this invention to provide a signal level monitor which controls a very fast de-energizing mechanism and a slow energizing mechanism.

The timing mechanism comprises a motor axially connected to a magnetic clutch. The magnetic clutch is coupled to a switch actuating arm through a slip clutch. A switch such as a microswitch is mounted so that the switch arm must rotate a given number of degrees in order to strike the switch plunger. The switch arm is further spring biased away from the switch plunger such that upon deactivation of the magnetic clutch the switch arm will rapidly rotate away from the switch plunger. When the magnetic clutch becomes energized, the motor will cause the switch arm to slowly rotate toward the switch plunger. After the prescribed time interval, the switch arm will strike the switch plunger and close the switch. The slip clutch permits the motor to continue to rotate, thereby protecting the motor and keeping the switch closed.

This invention further features a combining switch which sequentially samples the output voltages from a plurality of discriminators and combines them to form a continuous pulse train. An electronic control accepts the continuous pulse train and compares each pulse to a predetermined pulse magnitude reference. If any pulse should fall below the predetermined reference voltage, the electronic control means will deactivate the magnetic clutch in the timing mechanism. Deactivation of the magnetic clutch causes the control switch to open, thereby causing a flag to appear on the face of a navigation-type instrument as an indication that the circuit is not functioning. Opening the control switch additionally causes the navigation instrument to become electrically deactivated. After a prescribed interval of time the timing mechanism will cause the control switch to close, if during the prescribed time interval all pulses in the pulse train have been above the predetermined reference.

Further objects, features and advantages of the invention will become apparent from the following description and claims when read in view of the accompanying drawings, in which:

FIGURE 1 is a preferred embodiment of this invention;

FIGURE 2 is a detailed drawing of the multiple circuit signal combining switch; and FIGURES 3A–3E illustrate waveforms in the system.

Referring to FIGURE 1, a preferred embodiment of this invention is shown, along with the doppler navigation receiver system. Antennas A, B, and C are connected through a sequential antenna signal amplifier means 15 to respective discriminators A, B, and C. The sequential antenna signal amplifier means 15 includes two rotary switches 10a and 10b. Switch segments 11a, 12a, and 13a of switch 10a are connected to antennas A, B, and C respectively, and switch segments 11b, 12b, and 13b of switch 10b are connected to discriminators A, B, and C respectively. A receiver 12 is connected to the rotary arms 14a and 14b of the switches. The rotary arms 14a and 14b are synchronously rotated by a motor 19 mechanically connected to the rotors through a shaft 13.

The signal outputs from discriminators A, B, and C are applied to a utilization device 20 which may be a computer or similar apparatus. The output of the computer is connected to the indicator 22 through a relay contact 21. Utilization device 20 may have a plurality of outputs connected to the indicator in order that the indicator may perform more than one function. The relay 70, then, would require a plurality of interrupter switches 21. The indicator 22 might indicate ground speed.

Since the purpose of this invention is to insure that the information fed to indicator 22 is reliable at all times, a discriminator output voltage comparing means is connected to the plurality of discriminators. Each discriminator, then, has its output voltage sequentially compared to a reference voltage. To perform the function a sequential signal sampling switch or signal combining switch 25 has its segments 26, 27, and 28 connected to the output of discriminators A, B, and C respectively. Its rotor is angularly synchronized in the same manner as rotors 14a and 14b of switches 10a and 10b through shaft 13. In addition to contacts 26, 27, and 28 are three small contact segments 29a, b, and c which are connected to a source of constant current such as 25 microamperes. Battery 28 and potentiometer 9 are used to adjust this current. A rotor arm 30 makes electrical contact with contacts 26, 27, 28 and segments 29a, b, and c. Contacts 26, 27, and 28 will make contact with rotor 30 over the same angular rotation as will the contacts on switches 10a and 10b. Segments 29a, b, and c cover the angular rotation between the gaps and switch segments 26, 27, and 28. Thus rotor 30 will either be contacting one of the switch segments 26, 27, or 28, or a switch segment 29a, b, or c. The rotor 30 of the pulse-combining switch is connected to an input 31 of a gate 32. The output of gate 32 is connected to an input 33 of a control amplifier 34. The output of control amplifier 34 is connected to an input 35 of a relay amplifier 36.

The output of relay amplifier 36 is connected to a second source of potential such as battery 37 through a relay coil 38. Relay 38 has two contacts 39 and 40. Contact 39 is connected to power source 37 and contact 40 is connected to ground through the energizing winding 41 of a magnetic clutch 42.

The timing mechanism is operated by a motor 50 in combination with a speed reduction device 51 which rotates a shaft 52 at a predetermined speed that might be, for example, 48 revolutions per minute. Magnetic clutch 42 is composed of two surface plates 53 and 54. Plate 53 is nonrotatably mounted on shaft 52, and plate 54 is nonrotatably mounted on a shaft 55. Shaft 55 is rotatably mounted in a bearing support 56. A slip clutch 57 comprises two plates 58 and 59. Plate 58 is nonrotatably mounted to the other end of shaft 55 and plate 59 is nonrotatably mounted to a shaft 60. Shaft 60 is rotatably supported in a second bearing support 61.

A switch lever 62 is nonrotatably mounted on the other end of shaft 60 by means such as a set screw 63.

Switch 64 is mounted on a bracket 65 such that a hammer 66 of switch arm 62 will strike a switch-operating mechanism 67. Switch 64 is connected through a wire 68 to battery 37 and to ground through solenoid 70.

A flag 71 is mounted at one end of a flag-operating arm 72 which is pivotally mounted on pivot 73. A spring 74 is connected to the opposite end of flag arm 72 to bias the flag in the visible face of indicator 22. The flag arm is connected to the solenoid at point 75 by mechanical linkage 76. This linkage also connects the solenoid 70 to interrupter switch 21.

FIGURE 2 illustrates switch 25. The discriminator A is connected by lead 81 to segment 82. The discriminator B is connected by the lead 83 to segment 84. The discriminator C is connected by the lead 86 to segment 87. The brush 30 has two contact points 88 and 89. Contact point 88 engages segments 82, 84, and 87; whereas, the contact point 89 engages the segments 29a, 29b, and 29c.

FIGURE 3A is a plot of a possible input from discriminator A to the segment 82 wherein the amplitude is presumed to be varying in accordance with the heights of the graph. Likewise, FIGURES 3B and 3C illustrate the input to segments 84 and 87 respectively from the discriminators B and C. FIGURE 3E illustrates the output of switch wiper blade 30 which appears on lead 91 and which is furnished to gate 32. FIGURE 3D illustrates the input to segments 29a, b, and c.

If at any time during the operation of the system the signal applied to the gate 32 falls below the reference level which might, for example, be 20 microamperes shown by the dotted line 92 in FIGURE 3E, the flag 71 will move up onto the face of the indicator 22. This is because the gate 32 is normally biased to cut off at any time that the signal supplied to it is above the reference level of, for example, −20 microamperes. The control amplifier is such that when the gate 32 is cut off control amplifier 34 will produce no output signal, and the relay amplifier 36 will not energize the relay 38. Contact 39 will not engage contact 40, and the normally closed switch 64 allows the battery 37 to energize the relay 70, thus holding switch 21 closed and the flag 71 down below the face of the indicator 22 so that it is not visible.

If at any time the input from the switch contact 30 into gate 32 falls below the reference level of, for example, −20 microamperes, the gate 32 will be opened, the signal will pass through the gate, be amplified in the control amplifier 34 and relay amplifier 36 to energize relay 38. This causes contacts 39 and 40 to engage and energize the magnetic clutch 42 by supplying power from the battery 37, thus causing the motor 50 to swing hammer 62 so that projection 66 engages switch contact 67 of switch 64, thus opening the switch and de-energizing relay 70. This immediately causes the flag 71 to move up to the solid line position in FIGURE 1 due to the bias action of the spring 74.

Also, the switch 21 is opened due to the mechanical linkage and the indicator arm 93 of indicator 22 will return to the zero position. The flag will stay in view until signal from switch contact 30 goes above the reference level of 20 microamperes, at which time the gate 32 will be closed and the relay 38 will be de-energized, thus opening contacts 39 and 40 which de-energize the magnetic clutch 42, which allows the hammer 62 to return to the position shown in FIGURE 1 out of engagement with switch contact 67 of switch 64. Switch 64 is then closed, and power from the battery 37 energizes the relay 70, thus moving the flag 71 out of sight on indicator 22. Simultaneously, the switch 21 is closed, allowing the utilization device 20 to supply a signal to the needle 93 of the indicator 22.

It is to be realized that the motor 50 continuously runs but actuates the arm 62 only when the magnetic clutch 42 is energized. When the magnetic clutch is energized the arm swings until it opens switch 64 by engagement with contact 67 and then the slip clutch 57 will slip, holding projection 66 in engagement with the contact 67 until the magnetic clutch 42 is de-energized.

Thus it is seen that this invention provides apparatus for immediately indicating when one of the plurality of control signals falls below a predetermined level, and thus prevents the continued monitoring of an instrument after its control source may have reached a condition where the information is no longer reliable. The circuitry is so constituted that it will rapidly recover and render the indication to the observer as soon as the control signals have reached a level above the minimum threshold.

Although this invention has been described with respect to a preferred embodiment thereof, it is not to be so limited, as changes and modifications may be made therein which are within the spirit and scope of the invention as defined by the appended claims.

We claim:

1. Apparatus for disabling an indicator comprising a warning flag pivotally mounted on said indicator and spring biased so as to be visible on the face of the indicator, a relay connected to the flag to move said flag to a position where it is not visible when the relay is energized, a voltage source connected to said relay, a normally closed switch connected in circuit with said voltage source and said first relay, a switch actuator engageable with said switch to open it, a driving means, a clutch connecting said driving means and said switch actuator, and a circuit for energizing said clutch in response to condition that render the indicator presentation incorrect.

2. A flag warning system for a doppler navigation apparatus wherein a plurality of antennas receive radiant energy from a plurality of directions, a plurality of discriminators which are sequentially fed the outputs from said antennas, a voltage comparison circuit receiving inputs from said plurality of discriminators and comparing respectively each output with a reference voltage level, a gate connected to the voltage comparison circuit and opened when an output from any of the discriminators falls below a predetermined level, a clutch mounted between a pair of shafts, the output of said gate connected to said clutch to engage it when a signal from one of said discriminators falls below the reference level, a driving means connected to the first of said shafts, the second of said shafts rotatably supported, a switch actuator mounted on said second shaft, electromagnetic means energized by a suitable voltage source, a normally closed switch in circuit with said electromagnetic means, said switch actuator engageable with said switch to open it upon energization of said clutch, an indicator with a flag warning normally in the visible position, said electromagnetic means connected to said flag warning to move it out of sight on said indicator when said electromagnetic means is energized, and a spring biasing means connected to said flag to move it into sight on said indicator when the electromagnetic means is unenergized.

3. A flag warning system for a doppler navigation apparatus wherein a plurality of antennas receive radiant energy from a plurality of directions, a plurality of discriminators which are sequentially fed the outputs from said antennas, a voltage comparison circuit receiving inputs from said plurality of discriminators and comparing respectively each output with a reference voltage level, a gate connected to the voltage comparison circuit and opened when an output from any of the discriminators falls below a predetermined level, a clutch mounted between a pair of shafts, the output of said gate connected to said clutch to engage it when a signal from one of said discriminators falls below the reference level, a driving means connected to the first of said shafts, the second of said shafts rotatably supported, a switch actuator mounted on said second shaft, electromagnetic means energized by a suitable voltage source, a normally closed switch in circuit with said electromagnetic means, said switch actuator engageable with said switch to open it upon energization of said clutch, an indicator with a flag warning normally in the visible position, said electromagnetic means connected to said flag warning to move it out of sight on said indicator when said electromagnetic means is energized, a spring biasing means connected to said flag to move it into sight on said indicator when the electromagnetic means is unenergized, said voltage comparison circuit comprising a rotating brush, a first plurality of segments respectively connected to the outputs of said plurality of discriminators and each engaged by said rotating brush, a second plurality of segments mounted between the first plurality of segments and connected to a reference voltage source and engageable with said rotating brush, the gate connected to said rotating brush and opened to pass a signal when an output from one of the plurality of discriminators falls below a predetermined point.

4. A flag warning system for an apparatus comprising an indicator with a flag pivotally attached thereto and spring biased to move into the face of the indicator when the control signal is unreliable, means for energizing said flag connected to said flag so as to move it to a position out of the face of the indicator when energized and allow it to move to a visible position on the face of the indicator when unenergized, a switch connected in series with said energizing means, a voltage source connected to said switch and supplying energy to said energizing means when said switch is closed, means for opening said switch, a switch control circuit receiving inputs from the signals fed to said indicator and determining whether said signals are reliable and causing said means for opening said switch to open the switch when said signals are unreliable, said means for opening said switch comprising a pair of shafts axially and rotatably mounted relative to each other, a switch actuating lever connected to the second of the shafts and engageable with said switch to open it, a clutch mounted between said first and second shafts, a driving means connected to the first shaft to continuously rotate it, a voltage comparison circuit receiving the signals that are fed to said indicator and comparing them with a reference signal, and said clutch connected to the voltage comparison circuit and energized when a control signal falls below a predetermined level.

References Cited in the file of this patent
UNITED STATES PATENTS

| | | |
|---|---|---|
| 2,664,558 | Konet et al. | Dec. 29, 1953 |
| 2,841,782 | McIlwain | July 1, 1958 |
| 3,005,095 | Stover et al. | Oct. 17, 1961 |